US012639831B2

(12) United States Patent     (10) Patent No.:   US 12,639,831 B2
Cao et al.     (45) Date of Patent:    May 26, 2026

---

(54) ACCURATE AND ROBUST VISUAL OBJECT TRACKING APPROACH FOR QUADRUPEDAL ROBOTS BASED ON SIAMESE NETWORK

(71) Applicant: BEIJING UNIVERSITY OF CHEMICAL TECHNOLOGY, Beijing (CN)

(72) Inventors: Zhengcai Cao, Beijing (CN); Junnian Li, Beijing (CN); Shibo Shao, Beijing (CN); Dong Zhang, Beijing (CN); Chengran Lin, Beijing (CN); Renjie Ju, Beijing (CN); Guofeng Du, Beijing (CN); Ji Xia, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 307 days.

(21) Appl. No.: 18/544,481

(22) Filed: Dec. 19, 2023

(65) Prior Publication Data

US 2024/0161315 A1    May 16, 2024

Related U.S. Application Data

(63) Continuation-in-part of application No. PCT/CN2023/096170, filed on May 25, 2023.

(30) Foreign Application Priority Data

Nov. 5, 2022    (CN) ......................... 202211381024.7

(51) Int. Cl.
   *G06T 7/246*      (2017.01)
   *G06V 10/77*      (2022.01)
        (Continued)

(52) U.S. Cl.
   CPC .......... *G06T 7/248* (2017.01); *G06V 10/7715* (2022.01); *G06V 10/774* (2022.01);
        (Continued)

(58) Field of Classification Search
None
See application file for complete search history.

(56) References Cited

U.S. PATENT DOCUMENTS

2019/0314983 A1* 10/2019 Otsuka ................... B25J 9/1697
2021/0165412 A1* 6/2021 Mihara ............... G05D 1/0214
(Continued)

FOREIGN PATENT DOCUMENTS

| CN | 113902991 A | 1/2022 |
|----|-------------|--------|
| CN | 114550269 A | 5/2022 |
| CN | 115909396 A | 4/2023 |

OTHER PUBLICATIONS

Luca Bertinetto, et al., Fully-Convolutional Siamese Networks for Object Tracking, arXiv:1606.09549v3 [cs.CV] Dec. 1, 2021, 2021, pp. 1-16.

(Continued)

*Primary Examiner* — Leon Flores
(74) *Attorney, Agent, or Firm* — Bayramoglu Law Offices LLC

(57) ABSTRACT

A moving object tracking approach for a quadrupedal robot based on a Siamese network comprises an RNN-based object detector for locating moving objects. The position information of moving objects is sent into a ResNet-based feature extractor. For regressing bounding boxes of a target object, a Siamese adaptive network is employed. Experimental results on several public benchmarks show that this approach achieves excellent VOT performances, e.g., it obtains EAO score by 0.452 points, Accuracy score by 0.592 points, and Robustness score by 0.155 points on public (Continued)

benchmark VOT2018. It is successfully used on a quadrupedal robot, which can accurately track a specific moving object in real-world complicated scenes.

3 Claims, 3 Drawing Sheets

(51) Int. Cl.
G06V 10/774 (2022.01)
G06V 10/82 (2022.01)
G06V 20/70 (2022.01)
G06V 40/16 (2022.01)
G06V 10/766 (2022.01)

(52) U.S. Cl.
CPC .............. *G06V 10/82* (2022.01); *G06V 20/70* (2022.01); *G06V 40/167* (2022.01); *G06V 40/171* (2022.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/30201* (2013.01); *G06V 10/766* (2022.01); *G06V 40/172* (2022.01)

(56) References Cited

U.S. PATENT DOCUMENTS

| | | | | |
|---|---|---|---|---|
| 2021/0402991 A1* | 12/2021 | Gautam | ................. | G06N 3/049 |
| 2023/0186492 A1* | 6/2023 | Yu | ........................... | G06T 7/246 |
| | | | | 382/100 |
| 2025/0291353 A1* | 9/2025 | Nguyen | ............... | B62D 57/024 |

OTHER PUBLICATIONS

Qing Guo, et al., Learning Dynamic Siamese Network for Visual Object Tracking, CVF Computer Vision Foundation, pp. 1763-1771, 2017.

Anfeng He, et al., A Twofold Siamese Network for Real-Time Object Tracking, CVF Computer Vision Foundation, pp. 4834-4843, 2018.

Tianyu Yang, et al., Learning Dynamic Memory Networks for Object Tracking, ECCV 2018 CVF Computer Vision Foundation, 2018, pp. 1-16.

Bo Li, et al., High Performance Visual Tracking with Siamese Region Proposal Network, CVPR CVF Computer Vision Foundation, pp. 8971-8980, 2018.

Zheng Zhu, et al., Distractor-aware Siamese Networks for Visual Object Tracking, ECCV 2018 CVF Computer Vision Foundation, 2018, pp. 1-17.

Bo Li, et al., SiamRPN++: Evolution of Siamese Visual Tracking with Very Deep Networks, arXiv:1812.11703v1 [cs.CV] Dec. 31, 2018, 2018.

Zhipeng Zhang, et al., Deeper and Wider Siamese Networks for Real-Time Visual Tracking, arXiv:1901.01660v3 [cs.CV] Mar. 28, 2019, 2019.

Yinda Xu, et al., SiamFC++: Towards Robust and Accurate Visual Tracking with Target Estimation Guidelines, 2019.

Dongyan Guo, et al., SiamCAR: Siamese Fully Convolutional Classification and Regression for Visual Tracking, CVPR 2020 CVF Computer Vision Foundation, 2020, pp. 6269-6277.

Zhipeng Zhang, et al., Ocean: Object-aware Anchor-free Tracking, arXiv:2006.10721v2 [cs.CV] Jul. 9, 2020, 2020, pp. 1-18.

Zedu Chen, et al., SiamBAN: Target-aware Tracking with Siamese Box Adaptive Network, Journal of Latex Class Files, 2015, pp. 1-17, vol. 14, No. 8, IEEE Transactions on Pattern Analysis and Machine Intelligence.

Joseph Redmon, et al., You Only Look Once: Unified, Real-Time Object Detection, arXiv:1506.02640v5 [cs.CV] May 9, 2016, 2016.

Shifeng Zhang, et al., Single-Shot Refinement Neural Network for Object Detection, CVPR CVF Computer Vision Foundation, pp. 4203-4212.

Hei Law, et al., CornerNet: Detecting Objects as Paired Keypoints, ECCV 2018 CVF Computer Vision Foundation, 2018, pp. 1-17.

Xingyi Zhou, et al., Bottom-up Object Detection by Grouping Extreme and Center Points, CVPR CVF Computer Vision Foundation, pp. 850-859, 2019.

* cited by examiner

ACCURATE AND ROBUST VISUAL OBJECT TRACKING APPROACH FOR QUADRUPEDAL ROBOTS BASED ON SIAMESE NETWORK

CROSS REFERENCE TO RELATED APPLICATION

This application is a Continuation-in-Part (CIP) application of International application number PCT/CN2023/096170, filed on May 25, 2023, which is based on and claims foreign priority to Chinese Patent Application No, 202211381024.7, filed on Nov. 5, 2022, which is hereby incorporated by reference in its entirety.

TECHNICAL FIELD

The invention relates, in general, to the field of intelligent robots, in particular to a moving object tracking approach for quadrupedal robots.

BACKGROUND

Quadrupedal robots have attracted much attention due to their potential to explore various terrains, e.g., stairs, slopes, and gravel roads. They have been widely used for security examination tasks in important scenes, e.g., schools, museums, stadiums, and public parks. Accurate identification and tracking of important targets will have important application value and practical significance for the safety and security of these locations. However, because of their movement with relatively high speed, tracking moving objects is a great challenge for them, especially when the scale or aspect ratio of objects vary. Therefore, how to classify and track moving objects for these robots is a difficult task.

Visual object tracking (VOT) is one of the fundamental tasks in computer vision with a wide range of applications, including intelligent monitoring, industrial inspection, and mobile robots. Due to the rapid advances of Artificial Intelligence, VOT has received great attention of researchers and practitioners. The core task of VOT is to predict the trajectory and state of a moving object in image sequences. However, moving objects are usually influenced by full occlusion, scale variations, illumination changes, motion blur, and deformation, which makes object tracking much more challenging.

Traditional methods usually recognize a target object given input videos, generate its bounding box, and determine its class. Then, moving object tracking is achieved by using the correlation coefficient. However, the scale and aspect ratio vary severely with the movement of mobile robots, resulting in generating inaccurate bounding boxes of target objects. Due to this, it is difficult to effectively match the same target object between adjacent images, making it difficult to obtain accurate positions of target objects.

In recent years, in-depth research of deep learning has been focusing on improving the performance of environmental perception, thus achieving and even exceeding object recognition performance of human standard. Various deep learning-based moving object tracking methods have been proposed. Compared to traditional ones, deep learning-based moving objects tracking methods have attracted the attention of researchers due to their accuracy and robustness.

Because of their end-to-end training capability and high efficiency, Siamese network-based VOT trackers have been widely applied for realizing VOT. They are classified into three classes: multi-scale search-based, anchor-based, and anchor-free ones. Multi-scale search-based trackers have been applied in numerous popular algorithms like SiamFC, DSiam, SA-Siam, and MemTrack. However, they cannot effectively deal with aspect ratio changes caused by the movement of quadruped robots. Anchor-based trackers, e.g., SiamRPN, DaSiamRPN, SiamRPN++, and SiamDW, perform better than multi-scale search-based trackers. But precisely designing and fine-tuning hyper-parameters of moving objects' anchor boxes is a core limitation for them. Anchor-free trackers including SiamFC++, SiamCAR, Ocean, and SiamBAN are not influenced by these hyper-parameter values. In this approach, anchor-free trackers are applied to fulfill VOT for quadruped robots.

Object detectors like YOLO, RefineDet, CornerNet, and ExtremeNet, have received considerable attention of researchers. These detectors can estimate the classes and positions of moving objects without especially designing hyper-parameters of objects' bounding boxes. Well-designed object detectors achieve outstanding performances and perform fast.

Although several studies have been done, the research of moving object tracking of quadrupedal robots is still in its infancy. Moving objects are usually occluded by each other or have low visibility due to the movement of quadrupedal robots. The inconsistency problem between their classification and object-aware features extraction exists, which remains a challenge.

SUMMARY

The present invention aims to provide a novel approach of moving object tracking for quadrupedal robots. The quadrupedal robot is equipped with a processor and an RGB-D camera. This approach includes two phases: training and testing, wherein:

The training phase is fulfilled by three modules which are deployed on the processor of the quadrupedal robot. An RNN-based object detector, a ResNet-based feature extractor, and a Siamese adaptive network-based object tracker.

The present disclosure proposes an RNN-based object detector that applies YOLO-v5s as a backbone network. This object detector is used to determine whether a pedestrian to be tracked exists. It determines whether the pedestrian is wearing a mask as well. The option to determine whether the pedestrian is wearing a mask can be chosen to decide to be closed or not. A Squeeze-and-Excitation Network is added at last within the backbone network to increase the attention of the region where a pedestrian to be tracked exists. NVIDIA TensorRT is applied to accelerate the inference speed of the proposed RNN-based object detector.

The ResNet-based feature extractor applies ResNet-50 as a backbone network. The downsampling operations are removed from the last two convolution blocks. The number of stride is set to 1 in the fourth and fifth convolution blocks. An 1×1 convolutional block is added at last to decrease output feature channels, which reduces the computational burden. The ResNet-based feature extractor includes a template branch and a search branch, which are applied to extract objects' semantic features at frame t and estimate objects' semantic features at frame t+1, respectively. Moving objects' semantic features within a 7×7 center region on the template branch are merely extracted to describe the whole target region.

The Siamese adaptive network-based object tracker includes a classification unit and a regression unit. They are applied to obtain semantic feature maps of target objects at next frame and compute the correlation coefficients of target objects' semantic feature maps between two consecutive frames, respectively. Each unit combines semantic feature maps by using a depth-wise cross-correlation layer.

The testing phase: After the training process of the proposed approach is finished, the RNN-based object detector is used to determine whether a pedestrian to be tracked exists. Then the Siamese adaptive network-based object tracker is applied to track this pedestrian.

The training phase is fulfilled by the following steps:

Step 1: A training dataset under real-world scenarios, i.e., schools, hospitals, museums, and public gardens, is collected.

Step 2: Frame sequences $(f_{t-1}, f_t)$, t=2, . . . T−1, and the moving object's ground-truth bounding box $b_1$ at the first frame are taken as inputs of the RNN-based object detector, where $f_t$ defines the bounding boxes information of pedestrians and their faces at frame t. The option to determine whether the pedestrian is wearing a mask is closed. The bounding boxes information is used to obtain the positions of pedestrians' faces.

Step 3: Class probability and bounding boxes of frame sequences $(f_{t-1}, f_t)$ are sent into the ResNet-based feature extractor to obtain the semantic features at frames t and t+1. The classification unit and a regression unit within the Siamese adaptive network obtain output object-aware features from the newly designed template and search branches, defined as $\varphi(z)$ and $\varphi(x)$, respectively. The size of the template patch and the search patch are set as 127×127 and 255×255 pixels, respectively.

Step 4: The overall training loss is obtained through $$\mathcal{L} = \lambda_1 L_c + \lambda_2 L_r \tag{1}$$

where $\lambda_1$ and $\lambda_2$ are hyper parameters. The Cross-Entropy loss is used to obtain $L_c$, and the Intersection over Union Loss (IOU) is applied to obtain $L_r$. Here, we set $\lambda_1 = \lambda_2 = 1$.

The pedestrian recognition loss at frame t, $L_c$, is obtained through $$L_c = -\sum_{i=1}^{n} y \ln(\hat{y}) + (1-y)\ln(1-\hat{y}) \tag{2}$$

where y and $\hat{y}$ define the true and estimated values whether a moving object can be tracked at frames t and t+1, respectively.

The regression loss of pedestrians' semantic features at frame t, $L_r$, is obtained through $$L_r = 1 - IOU \tag{3}$$

where IOU indicates the area ratio of IOU between the ground-truth bounding box at frame t and the estimated bounding box of a moving object at frame t+1.

Within the Siamese adaptive network, for obtaining convolution kernels $\varphi(z)_c$, $\varphi(z)_r$, $\varphi(x)_c$, and $\varphi(x)_r$ at frames t and t+1, $\varphi(z)$ and $\varphi(x)$ are taken as input.

For matching the same object at frames t and t+1, the classification and regression units apply a depth-wise cross-correlation layer for combining features, i.e., $$P_c = [\varphi(z)]_c * [\varphi(x)]_c \tag{4a}$$

$$P_r = [\varphi(z)]_r * [\varphi(x)]_r \tag{4b}$$

where * defines a convolution operation. $P_c$ and $P_r$ define a recognition feature map and a regression feature map, respectively.

The estimated score of the final result is obtained by using a weighted summation, which includes the final classification and target-aware scores via.

$$P_s = \omega P_c + (1-\omega)P_r \tag{5}$$

where $\omega$ defines the hyper parameter. Here, we set $\omega = 0.6$.

From $P_c$ and $P_r$, the predicted bounding boxes, which use $(p_{x_1}, p_{y_1})$ and $(p_{x_2}, p_{y_2})$ to define the positions of a predicted bounding box $b_t$ on top-left and bottom-right corner at frame t, respectively, are obtained as:

$$p_{x_1} = p_i - d_l^r \tag{6a}$$

$$p_{y_1} = p_j - d_t^r \tag{6b}$$

$$p_{x_2} = p_i + d_r^r \tag{6c}$$

$$p_{y_2} = p_j + d_b^r \tag{6d}$$

where $$d_l^r, d_t^r, d_r^r, \text{ and } d_b^r$$

define the distances between $(p_i, p_j)$ and the left, right, top, and bottom sides of a bounding box, respectively. $(p_i, p_j)$ can be regressed by using ellipse E1, i.e., $$\frac{(p_i - g_{c_x})^2}{\left(\frac{g_w}{4}\right)^2} + \frac{(p_j - g_{c_y})^2}{\left(\frac{g_h}{4}\right)^2} = 1 \tag{7}$$

where $$\frac{g_w}{4} \text{ and } \frac{g_h}{4}$$

are axes lengths. The values of width, height, and center point of a ground-truth bounding box are defined as $g_w$, $g_h$, and $(g_{x_c}, g_{y_c})$, respectively. If $(p_i, p_j)$ is located outside of E1, a negative label is assigned; otherwise, a positive label is assigned to it.

When $(p_{x_1}, p_{y_1})$ and $(p_{x_2}, p_{y_2})$ are obtained with the best score $P_s$, bounding box $b_t$ is selected as the final tracking result. Similarly, we can complete the dynamic object tracking task for a quadrupedal robot by traversing the entire video.

After the training process is finished, the proposed approach is deployed on a quadrupedal robot. The RGB-D camera on the quadrupedal robot is applied to collect the videos under real-world scenarios, the RNN-based object detector is applied to determine whether a pedestrian to be tracked exists. The ResNet-based feature extractor is applied to extract the semantic features of this pedestrian at frame t and estimate the semantic features of this pedestrian's face at frame t+1. The correlation coefficients of target objects' semantic feature are obtained by using the Siamese adaptive network-based object tracker. The same pedestrian at frames t and t+1 are matched by using the correlation coefficient. Similarly, we can complete the moving object tracking task for the quadrupedal robot by traversing the entire video. Tracking moving objects in this invention is fulfilled by these steps. The invention has the following advantages:

1. To fulfill VOT for quadrupedal robots, the present disclosure is the first one to use an anchor-free object detector to locate moving objects for an anchor-free object tracker. A one-stage detector for locating moving objects is designed at first. Then their position information is used as an input to the ResNet-based feature extractor.
2. A Siamese adaptive network is newly designed for VOT. Each bounding box of a target object with the best score is selected as the final tracking result.
3. The proposed approach is successfully applied on a quadrupedal robot. It can correctly and quickly track a pedestrian under real-world complicated scenarios.

The present disclosure is further described next with the preferred embodiment, but the present invention is not limited to the following examples.

DETAILED DESCRIPTION OF THE EMBODIMENTS

Figure 1:
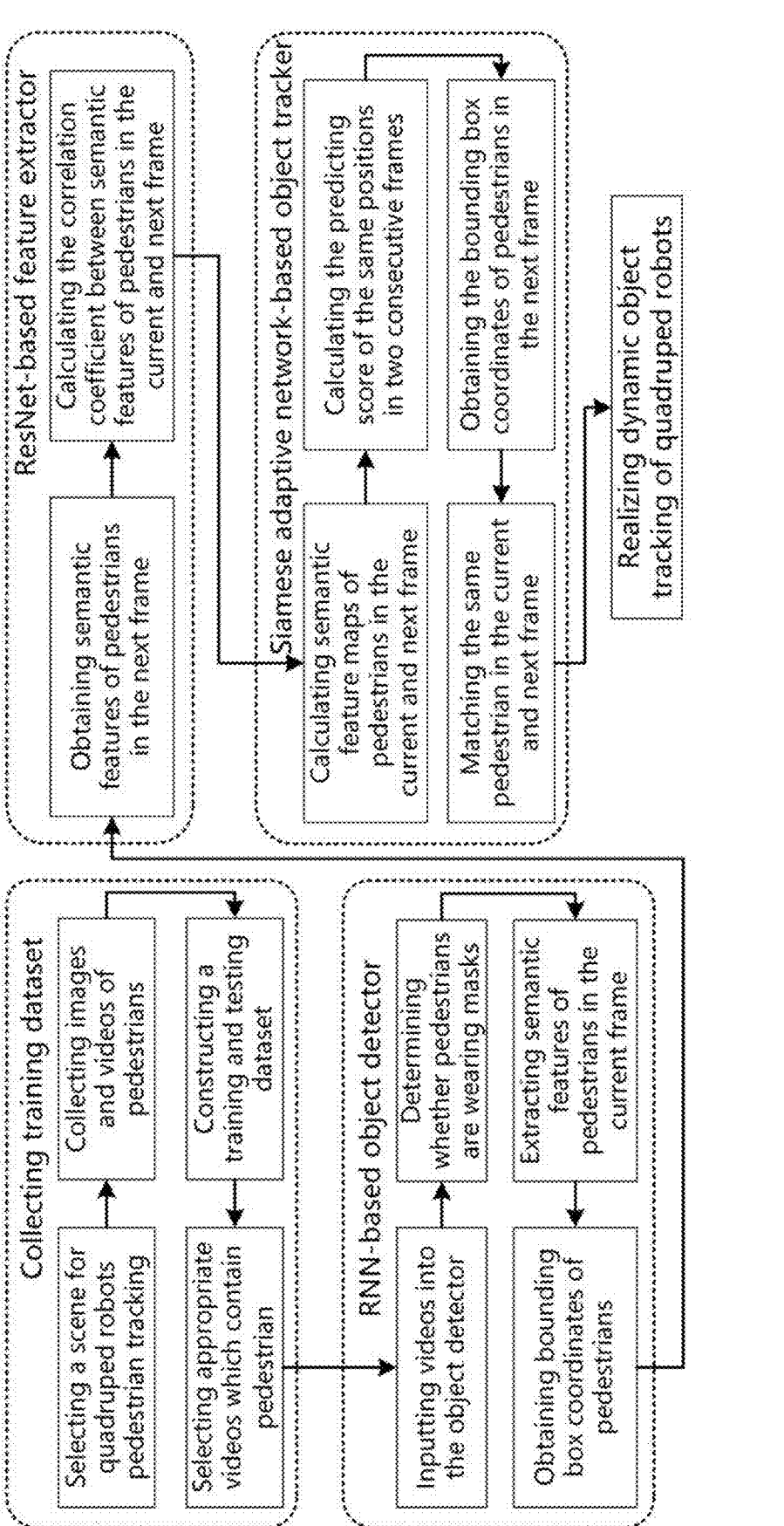
FIG. 1 shows the flowchart of the moving object tracking approach for a quadrupedal robot.
Figure 2:
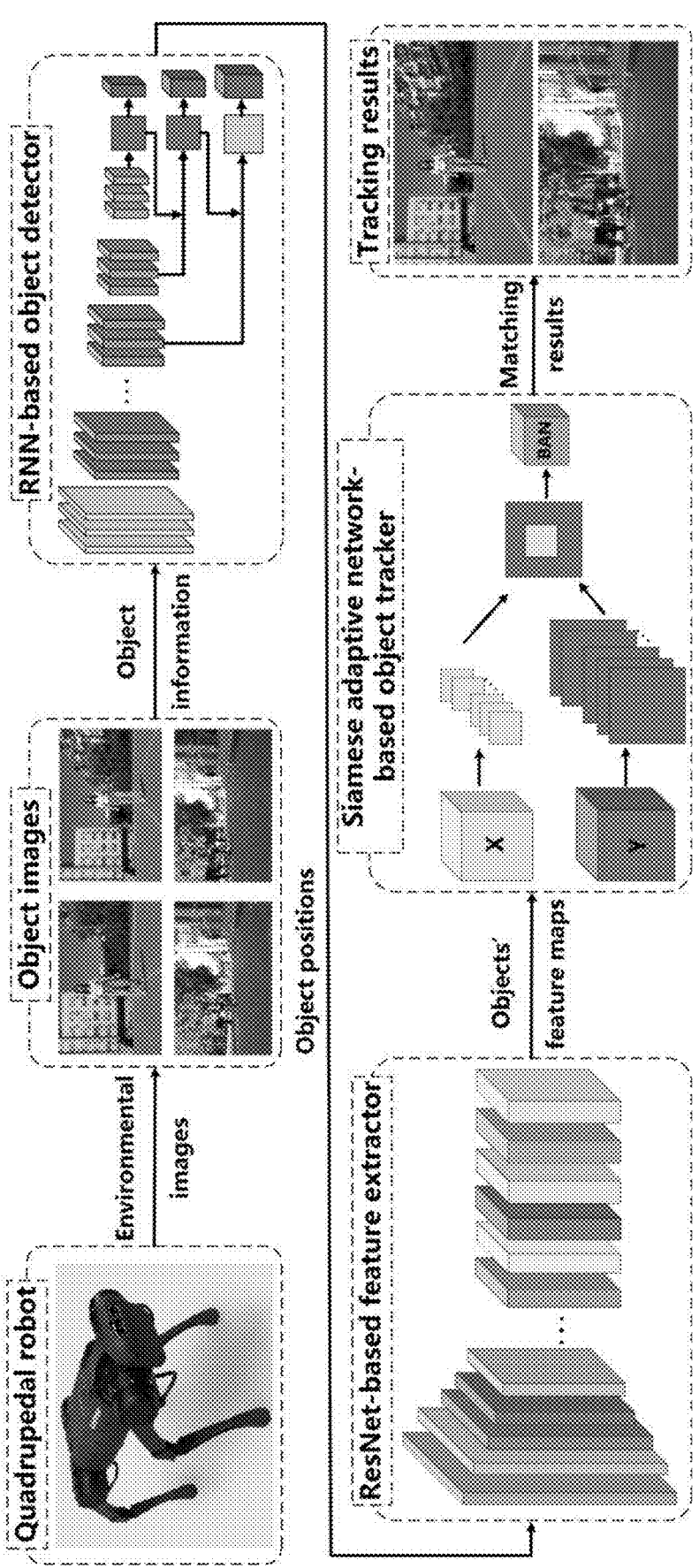
FIG. 2 shows the overall framework of the moving object tracking approach for a quadrupedal robot.

Exemplary embodiment 1: FIGS. 1 and 2 show a diagram of moving object tracking approach for quadrupedal robots. The proposed approach is used on a Unitree A1 quadrupedal robot, which is equipped with an NVIDIA Jetson TX2 processor and a RealSense RGB-D camera. This approach includes two phases: training and testing.

An RNN-based object detector, a ResNet-based feature extractor, and a Siamese adaptive network-based object tracker are deployed on the NVIDIA Jetson TX2 processor. After the training process is finished, the proposed approach is deployed on the quadrupedal robot. Firstly, based on surrounding scenarios, an RNN-based object detector is applied to determine whether a pedestrian to be tracked exists. Secondly, a ResNet-based feature extractor is used to obtain the semantic features of this pedestrian. Finally, the Siamese adaptive network-based object tracker calculates the correlation coefficient of the pedestrian's semantic feature maps between two adjacent frames. By using the correlation coefficient, matching the same pedestrian between adjacent frames can be fulfilled. Similarly, we can complete the dynamic object tracking task by traversing the entire video.

The ResNet-based feature extractor applies ResNet-50 as a backbone network. The downsampling operations are removed from the last two convolution blocks. The number of stride is set to 1 in the fourth and fifth convolution blocks. An 1×1 convolutional block is added at last to decrease output feature channels, which can reduce the computational burden. The ResNet-based feature extractor includes a template branch and a search branch, which are applied to extract objects semantic features at frame t and estimate objects' semantic features at frame t+1, respectively. Objects' semantic features within a 7×7 center region on the template branch are merely extracted to describe the whole target region;

The Siamese adaptive network-based object tracker includes a classification unit and a regression unit. They are applied to obtain semantic feature maps of target objects at next frame and compute the correlation coefficients between two consecutive frames of target objects' semantic feature maps, respectively. Each unit combines semantic feature maps by using a depth-wise cross-correlation layer.

The training phase is fulfilled by using the following steps:

Step 1: A dataset under real-world scenarios, i.e., schools, hospitals, museums, and public gardens, is collected by using the RealSense RGB-D camera on the quadrupedal robot. This dataset includes three parts: training, validating, and testing.

Step 2: Frame sequences $(f_{t-1}, f_t)$, t=2, . . . T−1, and the moving object's ground-truth bounding box $b_1$ at the first frame are taken as inputs of the RNN-based object detector, where $f_t$ defines the bounding boxes information of pedestrians and their faces at frame t. The option to determine whether the pedestrian is wearing a mask is closed. The bounding boxes information is used to obtain the positions of pedestrians' faces.

Step 3: Class probability and bounding boxes of frame sequences $(f_{t-1}, f_t)$ are sent into the ResNet-based feature extractor to obtain the semantic features at frames t and t+1. The classification unit and a regression unit within the Siamese adaptive network obtain output object-aware features from the newly designed template and search branches, defined as $\varphi(z)$ and $\varphi(x)$, respectively. The size of the template patch and the search patch are set as 127×127 and 255×255 pixels, respectively.

Step 4: The overall training loss is obtained through $$\mathcal{L} = \lambda_1 L_c + \lambda_2 L_r \tag{1}$$

where $\lambda_1$ and $\lambda_2$ are hyper parameters. The Cross-Entropy loss is used to obtain $L_c$, and the Intersection over Union Loss (IOU) is applied to obtain $L_r$. Here, we set $\lambda_1 = \lambda_2 = 1$.

The pedestrian recognition loss at frame t, $L_c$, is obtained through $$L_c = -\sum_{i=1}^{n} y \ln(\hat{y}) + (1 - y)\ln(1 - \hat{y}) \tag{2}$$

where y and $\hat{y}$ define the true and estimated values whether a moving object can be tracked at frames t and t+1, respectively.

The regression loss of pedestrians' semantic features at frame t, $L_r$, is obtained through $$L_r = 1 - IOU \tag{3}$$

where IOU indicates the area ratio of IOU between the ground-truth bounding box at frame t and the estimated bounding box of a moving object at frame t+1.

Within the Siamese adaptive network, for obtaining convolution kernels $\varphi(z)_c$, $\varphi(z)_r$, $\varphi(x)_c$, and $\varphi(x)_r$ at frames t and t+1, $\varphi(z)$ and $\varphi(x)$ are taken as input.

For matching the same object at frames t and t+1, the classification and regression units apply a depth-wise cross-correlation layer for combining features, i.e., $$P_c = [\varphi(z)]_c * [\varphi(x)]_c \tag{4a}$$

$$P_r = [\varphi(z)]_r * [\varphi(x)]_r \tag{4b}$$

where * defines a convolution operation. $P_c$ and $P_r$ define a recognition feature map and a regression feature map, respectively.

The estimated score of the final result is obtained by using a weighted summation, which includes the final classification and target-aware scores via $$P_s = \omega P_c + (1-\omega)P_r \qquad (5)$$

where $\omega$ defines the hyper parameter. We set $\omega = 0.6$.

From $P_c$ and $P_r$, the predicted bounding boxes, which use $(p_{x_1}, p_{y_1})$ and $(p_{x_2}, p_{y_2})$ to define the positions of a predicted bounding box $b_t$ on top-left and bottom-right corner at frame t, respectively, are obtained as:

$$p_{x_1} = p_i - d_l^r \qquad (6a)$$

$$p_{y_1} = p_j - d_t^r \qquad (6b)$$

$$p_{x_2} = p_i + d_r^r \qquad (6c)$$

$$p_{y_2} = p_j + d_b^r \qquad (6d)$$

where $$d_l^r, d_t^r, d_r^r, \text{ and } d_b^r$$

define the distances between $(p_i, p_j)$ and the left, right, top, and bottom sides of a bounding box, respectively. $(p_i, p_j)$ can be regressed by using ellipse E1, i.e., $$\frac{(p_i - g_{c_x})^2}{\left(\frac{g_w}{4}\right)^2} + \frac{(p_j - g_{c_y})^2}{\left(\frac{g_h}{4}\right)^2} = 1 \qquad (7)$$

where $$\frac{g_w}{4} \text{ and } \frac{g_h}{4}$$

are axes lengths. The values of width, height, and center point of a ground-truth bounding box are defined as $g_w$, $g_h$, and $(g_{x_c}, g_{y_c})$, respectively. If $(p_i, p_j)$ is located outside of E1, a negative label is assigned; otherwise, a positive label is assigned to it.

When $(p_{x_1}, p_{y_1})$ and $(p_{x_2}, p_{y_2})$ are obtained with the best score $P_s$, bounding box $b_t$ is selected as the final tracking result. Similarly, we can complete the dynamic object tracking task for a quadrupedal robot by traversing the entire video.

After the training process is finished, the proposed approach is used on a Unitree A1 quadrupedal robot. Experiments are performed under real-world scenarios. The RealSense RGB-D camera is used to capture the videos of surrounding scenarios. The RNN-based object detector is applied to determine whether a pedestrian to be tracked exists. It also estimates the position of a pedestrian to be tracked within the videos. The ResNet-based feature extractor is used to extract the semantic features at frame t and estimate the semantic features of the pedestrian at frame t+1. The correlation coefficients of target objects' semantic feature are obtained by using the Siamese adaptive network-based object tracker. Same pedestrian at frames t and t+1 are matched by using the correlation coefficients. Similarly, we can complete the dynamic objects tracking task for quadrupedal robot by traversing the entire video.

Several public benchmarks including COCO, Youtube BoundingBoxes, LaSOT, ImageNet VID, ImageNet DET and GOT10k are applied to train the proposed approach. This approach is trained on the PC with Intel® Xeon® Silver 4214R CPU @2.40 GHz×48, 4 NVIDIA GeForce RTX 3090 and 128 GB memory. The OS system is Ubuntu 22.04. Python 3.7 and Pytorch are applied to perform this approach. Hyper parameters are set as: Batchsize=16, Epochs=20, Learning rate=$5\times10^{-3}$, Weight decay=$1\times10^{-4}$, Momentum=0.9, and Optimizer=Stochastic Gradient Descent (SGD).

Figure 3:
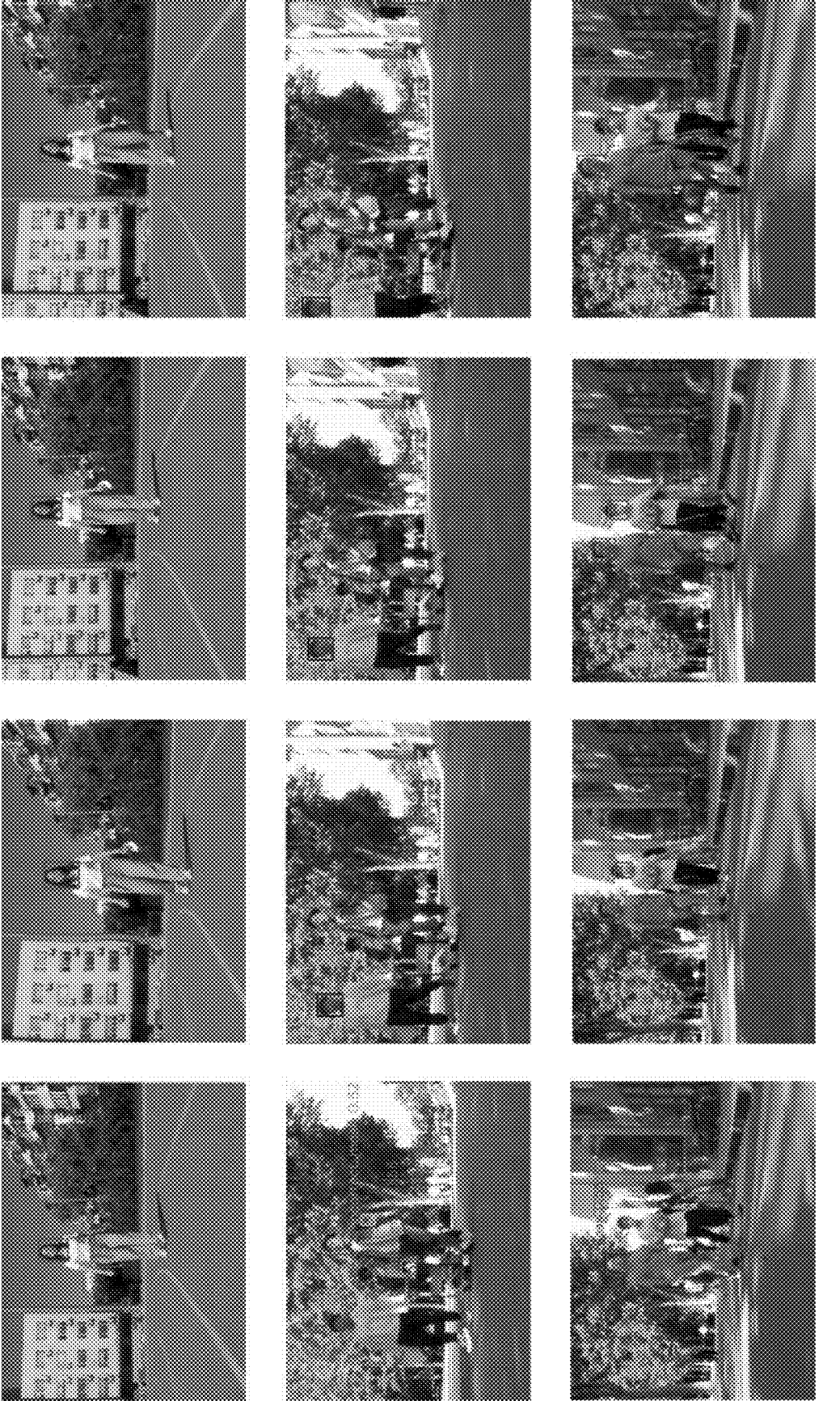
FIG. 3 shows the experimental results in the real-world scenes.

The proposed approach is used on a Unitree A1 quadrupedal robot, which is equipped with an NVIDIA Jetson TX2 processor and a RealSense RGB-D camera. During the experimental process, the captured videos have a size of 640×480, with the maximum frequency up to 60 FPS. Experiments are performed under complicated scenarios by using the Unitree A1 quadrupedal robot, and qualitative results are given in FIG. 3. It can be seen that this robot is able to track a specific pedestrian accurately, which shows its generalization ability and outstanding robustness for several challenging scenarios, e.g., schools, stadiums, public gardens, and supermarkets. The tracking accuracy is larger than 70%.

Exemplary embodiment 2: Compared to exemplary embodiment 1, within the exemplary embodiment 2, the present disclosure proposes an RNN-based object detector that applies YOLO-v5s as a backbone network. This object detector is used to determine whether a pedestrian to be tracked exists. It determines whether the pedestrian wears a mask as welt. The option to determine whether the pedestrian wears a mask can be decided to be closed or not. A Squeeze-and-Excitation Network is added at last within the backbone network to increase the attention of the region where a pedestrian to be tracked exists. NVIDIA TensorRT is applied to accelerate the inference speed of the RNN-based object detector.

Compared to exemplary embodiment 1, the step 2 of the training phase is changed as follows: Frame sequences ($f_{t-1}$, $f_t$), t=2, . . . T−1, and the moving object's ground-truth bounding box $b_1$ at the first frame are taken as inputs of the RNN-based object detector, where $f_t$ defines the bounding boxes information of pedestrians and their faces at frame t. The option to determine whether the pedestrian is wearing a mask is opened. Whether the pedestrian is wearing a mask or not and whether the pedestrian is wearing his/her mask accurately or not can be determined by using the RNN-based object detector. The bounding boxes information is used to obtain the positions of pedestrians' faces.

It can be seen that within the exemplary embodiment 2, whether the pedestrian is wearing a mask can be determined accurately, and the pedestrian who is not wearing a mask is tracked by using the proposed approach. It possesses generalization ability and outstanding robustness for several challenging scenarios, e.g., schools, stadiums, public gardens, and supermarkets. The detection accuracy of pedestrians is over 85%, in both daytime and nighttime. The tracking accuracy of pedestrians who is not wearing a mask is over 70%.

The above-mentioned embodiments only describe the preferred embodiment in the invention, not limit to the scope in the invention. On the premise of not departing from the design spirit in the invention, all kinds of deformation and improvement made by ordinary technicians in the art on the technical scheme in the invention shall be in the protection scope determined by the claims in the invention.

What is claimed is:

1. A method of moving object tracking for a quadrupedal robot, implemented by selecting a footed robot as the experimental platform and equipping the footed robot with a processor and a depth camera, the method comprises a training phase and a testing phase, wherein:

the training phase comprises deploying three modules on the processor of the quadrupedal robot, and the three modules are an Recurrent Neural Network (RNN)-based object detector, a Residual Neural Network (ResNet)-based feature extractor, and a Siamese adaptive network-based object tracker;

wherein the ResNet-based feature extractor applies ResNet-50 as a backbone network; the downsampling operations are removed from the last two convolution blocks; the number of stride is set to 1 in the fourth and fifth convolution blocks; a 1×1 convolutional block is added at last to decrease output feature channels, which can reduce the computational burden; the ResNet-based feature extractor includes a template branch and a search branch, which are applied to extract objects' semantic features at frame t and estimate objects' semantic features at frame t+1, respectively; objects' semantic features within a 7×7 center region on the template branch, are merely extracted to describe the whole target region;

the Siamese adaptive network-based object tracker includes a classification unit and a regression unit applied to obtain semantic feature maps of target objects at next frame and compute the correlation coefficients between two consecutive frames of target objects' semantic feature maps, respectively; each unit combines semantic feature maps by using a depth-wise cross-correlation layer;

the testing phase comprises: after the training phase, using the RNN-based object detector to determine whether a pedestrian to be tracked exists, and then applying the Siamese adaptive network-based object tracker to track the pedestrian;

wherein the training phase comprises the following steps:

step 1: collecting a training dataset under real-world scenarios;

step 2: taking frame sequences $(f_{t-1}, f_t)$, t=2, . . . T−1, and the moving object's ground-truth bounding box $b_1$ at the first frame as inputs of the RNN-based object detector, where $f_t$ defines the bounding boxes information of pedestrians and their faces at frame t; the option to determine whether the pedestrian is wearing a mask is closed; and the bounding boxes information is used to obtain the positions of pedestrians' faces;

step 3: sending class probability and bounding boxes of frame sequences $(f_{t-1}, f_t)$ into the ResNet-based feature extractor to obtain the semantic features at frames t and t+1; the classification unit and the regression unit within the Siamese adaptive network obtain output object-aware features from the newly designed template and search branches, defined as $\varphi(z)$ and $\varphi(x)$, respectively; and the size of the template patch and the search patch are set as 127×127 and 255×255 pixels, respectively;

step 4: obtaining an overall training loss through:

$$\mathcal{L} = \lambda_1 L_c + \lambda_2 L_r$$

where $\lambda_1$ and $\lambda_2$ are hyper parameters; the Cross-Entropy loss is used to obtain $L_c$, and the Intersection over Union Loss (IOU) is applied to obtain $L_r$;

a pedestrian recognition loss at frame t, $L_c$, is obtained through:

$$L_c = -\sum_{i=1}^{n} y \ln(\hat{y}) + (1-y)\ln(1-\hat{y})$$

where y and $\hat{y}$ define the true and estimated values whether a moving object can be tracked at frames t and t+1, respectively;

a regression loss of pedestrians' semantic features at frame t, $L_r$, is obtained through:

$$L_r = 1 - IOU$$

where IOU indicates the area ratio of IOU between the ground-truth bounding box at frame t and the estimated bounding box of a moving object at frame t+1;

within the Siamese adaptive network, for obtaining convolution kernels $\varphi(z)_c$, $\varphi(z)_r$, $\varphi(x)_c$, and $\varphi(x)_r$ at frames t and t+1, $\varphi(z)$ and $\varphi(x)$ are taken as input;

for matching the same object at frames t and t+1, the classification and regression units apply a depth-wise cross-correlation layer for combining features, $$P_c = [\varphi(z)]_c * [\varphi(x)]_c$$

$$P_r = [\varphi(z)]_r * [\varphi(x)]_r$$

where * defines a convolution operation; $P_c$ and $P_r$ define a recognition feature map and a regression feature map, respectively;

the estimated score of the final result is obtained by using a weighted summation, which includes the final classification and target-aware scores via:

$$P_s = \omega P_c + (1-\omega) P_r$$

where $\omega$ defines a hyper parameter different from $\lambda_1$ and $\lambda_2$; from $P_c$ and $P_r$, the predicted bounding boxes, which use $(p_{x_1}, p_{y_1})$ and $(p_{x_2}, p_{y_2})$ to define the positions of a predicted bounding box $b_t$ at frame t on top-left and bottom-right corner, respectively, are obtained as:

$$p_{x_1} = p_i - d_l^r$$

$$p_{y_1} = p_j - d_t^r$$

$$p_{x_2} = p_i + d_r^r$$

$$p_{y_2} = p_j + d_b^r$$

where $$d_l^r, d_t^r, d_r^r, \text{ and } d_b^r$$

define the distances between $(p_i, p_j)$ and the left, right, top, and bottom sides of a bounding box, respectively; $(p_i, p_j)$ can be regressed by using ellipse E1, $$\frac{(p_i - g_{c_x})^2}{\left(\frac{g_w}{4}\right)^2} + \frac{(p_j - g_{c_y})^2}{\left(\frac{g_h}{4}\right)^2} = 1$$

where $$\frac{g_w}{4} \text{ and } \frac{g_h}{4}$$

are axes lengths; the values of width, height, and center point of a ground-truth bounding box are defined as $g_w$, $g_h$, and $(g_{x_c}, g_{y_c})$, respectively; if $(p_i, p_j)$ is located outside of E1, a negative label is assigned; otherwise, a positive label is assigned to it;

when $(p_{x_1}, p_{y_1})$ and $(p_{x_2}, p_{y_2})$ are obtained with a best score $P_s$, bounding box $b_t$ is selected as a final tracking result; a dynamic object tracking task is completed for the quadrupedal robot by traversing an entire video.

2. The method according to claim 1, further comprising: after the training phase, using a RGB-D camera on the quadrupedal robot to capture the videos of real-world environments; applying the RNN-based object detector to determine whether a pedestrian to be tracked exists; obtaining the positions of pedestrians by using the RNN-based object detector as well; applying the Res-Net-based feature extractor to extract the semantic features of this pedestrian at frame t and estimate the semantic features of this pedestrian's face at frame t+1; obtaining the correlation coefficients of target objects' semantic feature by using the Siamese adaptive network-based object tracker; matching the same pedestrian at frames t and t+1 by using the correlation coefficient; and completing the moving object tracking task for the quadrupedal robot by traversing the entire video.

3. The method according to claim 1, further comprising: applying, by the RNN-based object detector, You Only Look Once (YOLO)-v5s as a backbone network; using the object detector to determine whether a pedestrian to be tracked exists and whether the pedestrian wears a mask; disabling an option to determine whether the pedestrian wears the mask; adding a Squeeze-and-Excitation Network within the backbone network to increase the attention of the region where a pedestrian to be tracked exists; and applying NVIDIA TensorRT to accelerate an inference speed of the RNN-based object detector.

\* \* \* \* \*